United States Patent [19]

Davison et al.

[11] Patent Number: 4,677,025

[45] Date of Patent: Jun. 30, 1987

[54] UNIQUE MOLECULAR WEIGHT DISTRIBUTION POLYBUTYLENE BLEND AND FILM

[75] Inventors: Sol Davison, Houston; Charles C. Hwo, Sugarland, both of Tex.

[73] Assignee: Shell Oil Company, Houston, Tex.

[21] Appl. No.: 770,911

[22] Filed: Aug. 30, 1985

[51] Int. Cl.$^4$ .................. C08L 23/20; C08L 23/26
[52] U.S. Cl. .................................... 428/349; 428/516; 525/240; 525/192; 525/193; 525/194; 525/335; 525/387; 528/481; 528/491; 528/503
[58] Field of Search .................. 525/240, 192–194; 428/516, 349

[56] References Cited

U.S. PATENT DOCUMENTS

| | | |
|---|---|---|
| 3,144,436 | 8/1964 | Greene et al. |
| 3,198,779 | 8/1965 | Kray et al. ............... 528/241 |
| 3,230,288 | 1/1966 | Henderson ............... 525/240 |
| 3,341,621 | 9/1967 | Hagemeyer et al. ...... 525/323 |
| 3,862,265 | 1/1975 | Steinkamp et al. ....... 260/878 |
| 3,887,534 | 6/1975 | Baba et al. ............... 260/93.7 |
| 3,894,120 | 7/1975 | Frese et al. ............. 525/240 |
| 3,898,209 | 8/1975 | Watson et al. .......... 260/93.7 |
| 3,940,379 | 2/1976 | Castagna et al. ........ 260/88.2 |
| 4,001,172 | 1/1977 | Steinkamp et al. ...... 260/42.18 |
| 4,061,694 | 12/1977 | Castagna ................. 260/878 |
| 4,087,486 | 5/1978 | Fielding et al. ......... 260/897 |
| 4,125,662 | 11/1978 | Weiner et al. ........... 428/213 |
| 4,275,120 | 6/1981 | Weiner .................... 428/516 |
| 4,298,722 | 11/1981 | Collette et al. .......... 525/240 |
| 4,359,495 | 11/1982 | Schroeder et al. ...... 428/35 |
| 4,375,531 | 3/1983 | Ross ........................ 525/93 |
| 4,378,451 | 3/1983 | Edwards .................. 525/240 |
| 4,387,185 | 6/1983 | Schroeder et al. ...... 525/194 |

FOREIGN PATENT DOCUMENTS 53-034834 3/1978 Japan .

*Primary Examiner*—Carman J. Seccuro

[57] ABSTRACT

An unusual polybutene-1 polymer blend based on the ability of polybutene-1 to undergo random scission of molecules in a chemical cracking process. Such cracked polymer when blended back with the parent polybutene-1 produces a unique molecular weight distribution which is manifested in a unique and valuable combination of processing behavior and mechanical, optical and thermal properties of film made from the blend. Good hot tack, low heat sealing temperature and high clarity as well as improved processability are simultaneously achieved in these films.

20 Claims, 3 Drawing Figures

RANDOM SCISSION OF POLYBUTYLENE 8A

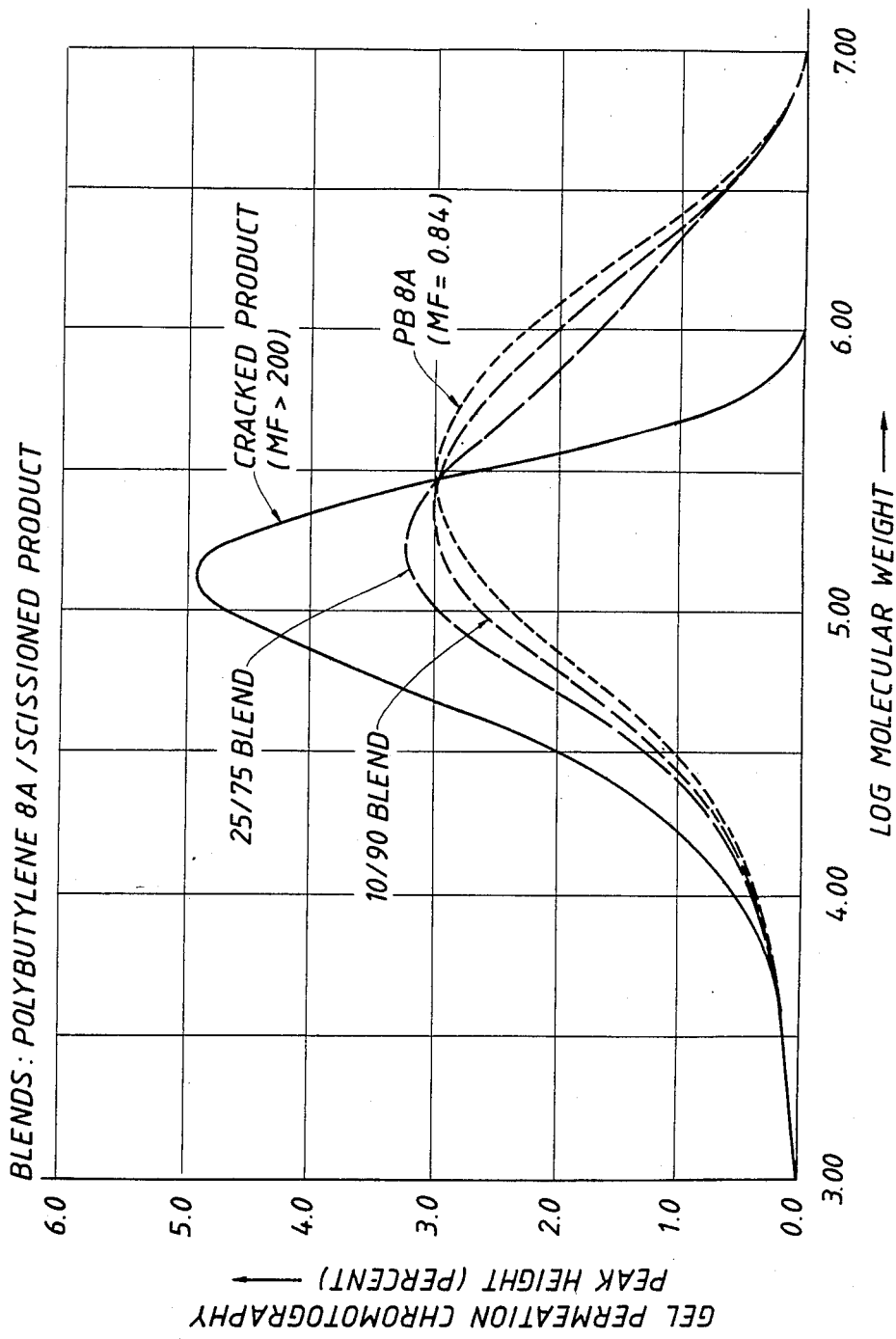

UNIQUE MOLECULAR WEIGHT DISTRIBUTION POLYBUTYLENE BLEND AND FILM

BACKGROUND OF THE INVENTION

The present invention relates to polybutylene (polybutene-1) polymer blend and a film made from such blend. More particularly, the invention relates to a polybutylene polymer blend having a unique molecular weight distribution and a film having a unique combination of good hot tack, low heat sealing temperature and high clarity. Even more particularly, the invention relates to a polybutylene blend made by chemical degradation (also known as chemical cracking or random scission by chemical means) of a portion of a reactor polybutylene and blending back the cracked portion with the original parent reactor polybutylene. The resulting blends have been shown to possess a unique molecular weight distribution not achievable in either the pure uncracked or cracked polymers, such unique molecular weight distribution manifesting itself in unusual combinations of processing behavior and physical properties of film fabricated from the blend.

Polybutylene film, as known commercially, shows deficiencies in hot tack and processing behavior, as well as clarity. Heretofore, it was thought that the cause of this unfavorable balance of properties was inherent in the polybutylene itself. However, applicants have found that a unique molecular weight distribution of the polybutylene polymer blend and resulting film surprisingly improves the hot tack, lowers the heat sealing temperature and improves the clarity of the composition and film.

Hot tack may be defined as the bonding strength between two pieces of polymer film at the point immediately after their having been joined together by application of heat and while the polymer is in a semi-molten solidifying state. Films are often made into packages which are sealed by applying heat to contacting surfaces. The seal must attain sufficient strength to contain the materials within the package. Not only does the weight of the material or product contribute to a tendency for seals to release, but in addition, the pressure of air used to assist in transport of the product may exert additional pressure against the seal.

In addition to good hot tack, a low heat seal initiation temperature is desired so that a film may be sealed at a relatively low temperature. Commonly used seal layers, such as propylene-ethylene copolymer, melt at a high temperature relative to the main packaging film, i.e. it has a high heat sealing temperature.

In addition, it is important that the film and ultimate package possess high clarity for good "see-through" properties to gain commercial acceptance. Heretofore, polybutylene films for packaging have been deficient in one or more of these desired properties.

Japanese Pat. No. J-53034834 discloses a transparent strong adhesive tape attained by tackifying one surface of biaxially drawn films comprising polymer mixtures containing 20 to 80% by weight of polypropylene and 80 to 20% by weight of polybutylene having a molecular weight of 500 to 20,000, which gives good transparency to the film.

U.S. Pat. No. 3,198,779 discloses a process for producing a synthetic hydrocarbon resin which comprises thermally cracking a polybutene-1 resin with molecular weight of at least 50,000 and an isotactic content of at least 10% by weight by introducing the polybutene-1 resin into a thermocracking zone at a temperature from 250° to 450° C. under a pressure of from 0.001 to 25 mm of mercury and under non-oxidizing conditions and maintaining the polybutene-1 resin in the zone until the molecular weight of the resulting hydrocarbon is within the range of 3,000 to 45,000 and recovering the resin from this cracking zone. This invention relates to the recovery of hydrocarbon resins useful as wax substitutes. These resins have low molecular weights and the advantage of good solubility in hydrocarbon solvents. These resins are used in the production of coatings resulting in superior flexible coatings which will not crack upon flexure of the substrate to which the coating is applied.

SUMMARY OF THE INVENTION

Applicants have surprisingly discovered an unusual type of polybutylene-1 polymer blend based on the ability of polybutene-1 to undergo random scission of molecules in a chemical cracking process. Such cracked polymer when blended back with the parent polybutylene-1 produces a unique and valuable combination of processing behavior and mechanical, optical and thermal properties of film made from the blend. Good hot tack, low heat sealing temperature and high clarity as well as improved processibility are simultaneously acheived in these films. Heretofore it has been thought that achieving this combination of properties in polybutylene was impossible due to the inherent nature of polybutylene-1. Applicants have surprisingly discovered that the invention blends although still retaining the chemical nature of polybutene-1 achieve this desirable combination of properties by a significant modification of the molecular weight distribution from that of normally manufactured polybutene-1.

BRIEF DESCRIPTION OF THE DRAWINGS

FIG. 3 is a graph of the molecular weight distribution curves for blends of polybutylene 8A and scissioned product, wherein the curves are generated by plotting gel permeation chromaphic peak height (in percent) against the log of the molecular weight of each blend and the polybutylene 8A.

DETAILED DESCRIPTION OF THE INVENTION

Figure 1:
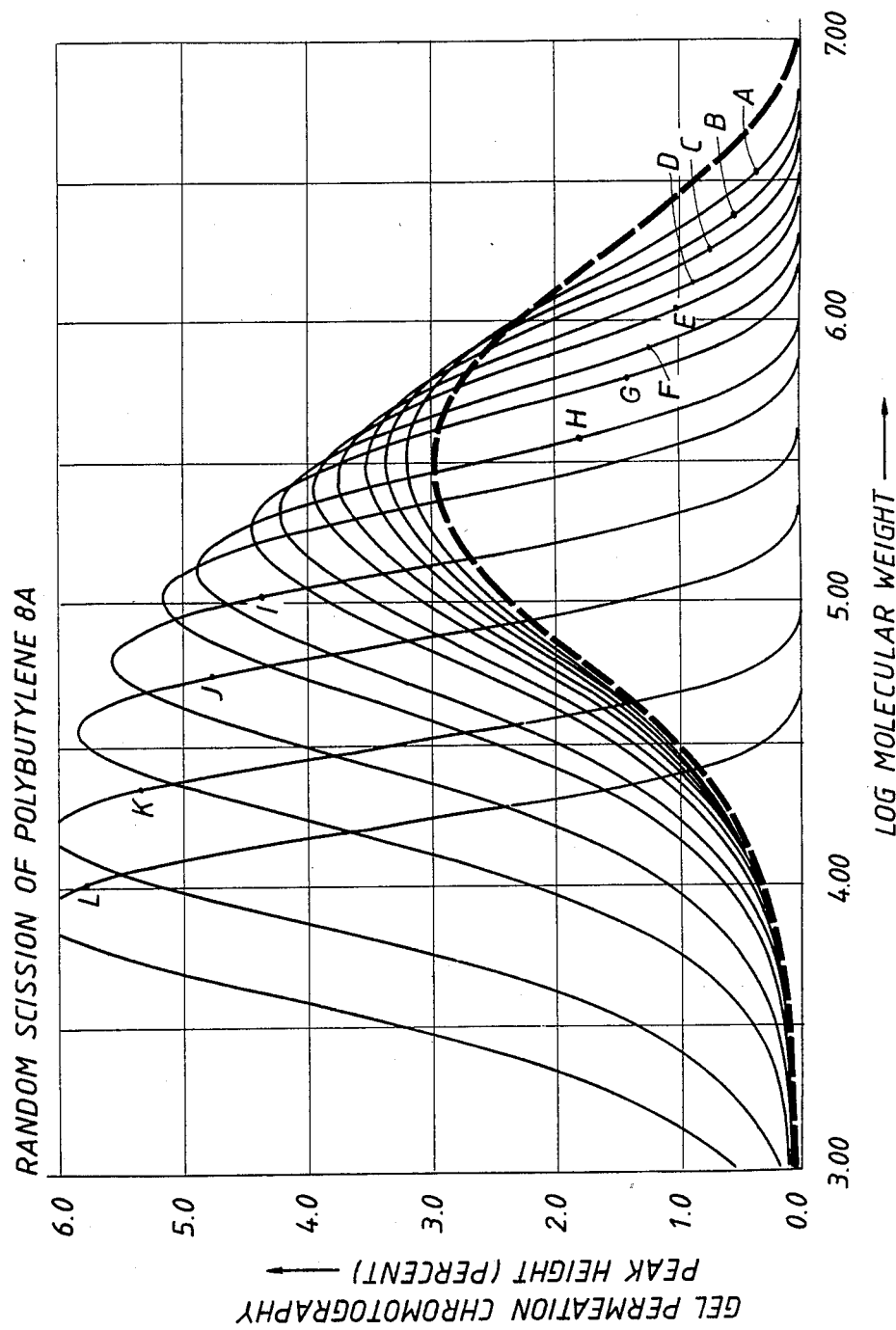
FIG. 1 is a graph of the molecular weight distribution curves for polybutylene 8A, wherein the curves are generated by plotting gel permeation chromagraphic peak height (in percent) against the log of the molecular weight of the polybutylene 8A base.
Figure 2:
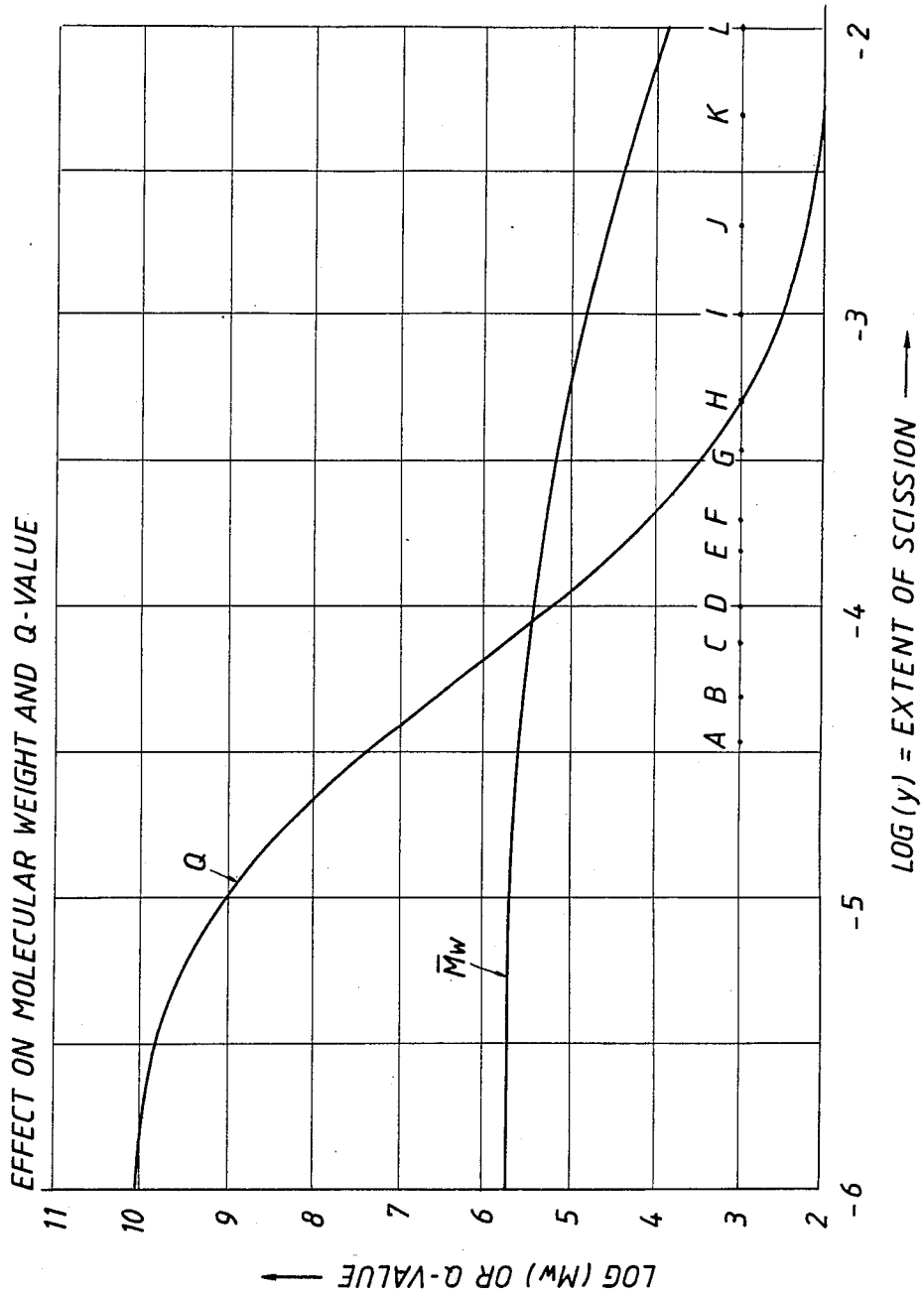
FIG. 2 is a graph of random scission of polybutylene 8A, when the curves are the molecular weight or Q value of the polybutylene 8A.

Polybutylene-1 when subjected to certain chemical agents such as peroxides under appropriate conditions undergoes a special type of degradation sometimes known as cracking which is random scission of the polymer molecules. The process is comparable to that undergone by other polymers, particularly polypropylene. A basic concept of accomplishing such degradation by utilizing peroxides is claimed in U.S. Pat. No. 3,144,436, where a free radical initiator is introduced into a polymer melt in the absence of oxygen in a screw extruder. U.S. Pat. No. 3,940,379 discloses a method for the degradation of propylene polymers to increase their melt flow rate which comprises contacting a propylene polymer with oxygen and an organic or inorganic peroxide, melting and working the resulting mixture in a high shear zone, and recovering an essentially odor-free propylene polymer. U.S. Pat. No. 4,061,694 discloses the manufacture of polypropylene molding compositions of improved impact strength by subjecting block copolymers of ethylene and propylene to controlled oxidative degradation under conditions essentially similar to those of the preceding patent. Other patents dealing with degradation of polypropylene include U.S. Pat. Nos. 4,375,531; 3,862,265; 3,887,534; 3,898,209; 4,001,172; 4,087,486; 4,359,495; 4,378,451 and 4,387,185. The extent of such random scission is governed by the amount of chemical agent present. FIG. 1 shows the molecular weight distribution (MWD) of reactor polybutene-1 PB 8A with a melt index of 0.84 dg/min. Also shown are the cracked product MWD's, all originating from PB 8A over a wide range of cracking levels, from low to high, A to L. The plots are in the GPC format where equal area represent equal weights of polymer independent of location on the figure and all plots have been normalized to enclose equal total areas. Thus certain important features of the MWD changes occurring with the cracking process may be easily seen. Thus, with increasing cracking of PB 8A: (1) The high molecular weight tail is progressively lost. (2) The peak is shifted to lower molecular weights and becomes progressively higher and narrower. (3) At low or moderate degrees of cracking, A to H, there is very little build-up in the low molecular tail, but this becomes appreciable at high degrees of cracking, I to L. FIG. 2 shows the corresponding plots of logarithm of the molecular weight average (weight average, MW/w) and the Q-value (ratio of MW/w to the number molecular weight average, MW/n) for the cracked products A to L. The Q-value is a measure of the breadth of the MWD, so that it is seen that progressive cracking of PB 8A both reduces the weight average molecular weight and narrows the MWD.

A cracked product corresponding to H was selected as the blending component that along with the parent compound PB 8A constitute part of the subject blends of this invention. It is seen from FIG. 1 that H has totally lost the high molecular weight tail above one million MW, whereas it has not appreciably increased its low molecular weight tail. Overall, it has increased its MWD in the mid-range, with an appreciable shift in peak location to lower MW. H has shown a melt index of over 200 compared to that of the parent PB 8A of 0.84. From FIG. 2, it is seen that MW/w and Q of H are 136,000 and 3.32 compared to 622,000 and 10.20 respectively, of the parent copolymer.

FIG. 3 reproduces the MWD's of H and PB 8A and, in addition, the MWD's of two blends made from these components; a 10/90 blend and a 25/75 blend by weight, part of the subject blends of this invention. It is seen that the MWD's of the blends are uniquely different from those of the components and this difference works most advantageously. The retention of most of the original high molecular tail preserves the good film mechanical properties of polybutene-1, at the same time retaining the melt elasticity required for melt strength. Furthermore, melt viscosity is reduced by the mid-molecular weight shift to lower values, and also the relative increase in free molecular ends improves self-adhesion (hot tack) and heat sealing properties because of improved molecular mobility across the interface of contacted services. Clarity is most likely improved by the increased molecular mobility reducing the number of light scattering defects in the surface as well as in the interior of the film. On the other hand, this improvement of molecular mobility does not depend on an increase in low molecular weight tail, as evidenced by FIG. 3, so that the well known deleterious influence of such excessive tail on mechanical properties and solubility are absent in these blends.

EXPERIMENT 1

Chemical degradation experiments were carried out to determine the proportion of peroxide concentrate (PC) to PB in order to attain a "super high" melt flow of 200. PC is composed of 4.6% LUPERSOL 101XL (Lucidol, a Division of Pennwalt Corp) in LDPE, and LUPERSOL 101XL is about 50% LUPERSOL 101 peroxide absorbed on inert filler.

Extrusion on a $\frac{3}{4}''$ CW Brabender extruder was done at conditions of 160 RPM, 150° C. (Zone 1), 170° C. (Zone 2 to 4). The homopolymer BR2A was chemically degraded at peroxide concentrate levels of 0.1, 0.5, 1, 2, 3, 4, 5, 6, 7, 8, 9, 12 and 15% by weight. The strands were manually collected after passing through a bath and conditioned overnight at room temperature and pelletized the following day.

Copolymer PB8A, the second material, was then chemically degraded. Peroxide concentrate levels of 3, 6, 12 and 15% were used and even more effective stranding was achieved by an extended water bath, namely, a cooling bath with dry ice, and then passing the extruded strand out of the bath into the air and back into the bath before final pelletization. Chemically degraded PB8A at 3, 6, 12 and 15% PC was melt mixed with undegraded PB 8A at 10:90 and 25:75 blending ratios.

Blended degraded to undegraded PB at ratios of 10:90 and 25:75 were compared. Heat seal as well as processability was signifcantly improved in the blends.

EXPERIMENT 2

PC at 3, 6, 12 and 15% by weight levels was used to chemically degrade PB8A. Table 1 shows that the melt flow in excess of 200 was attained when PB8A was chemically degraded at 15% PC levels. Blends with degraded to undegraded PB at ratios of 10:90 and 25:75 were melt blended via a $\frac{3}{4}''$ Brabender extruder with conditions of 150° C. starting temperature, 170° C. die temperature with an extruder RPM of 160.

Film casting was done through the $1\frac{1}{4}''$ Brabender extruder with Killion die. Operating conditions for all blends were 200° C. (Zone 1), 220° C. (Zone 2 to 5). Chill roll temperature was 16° C. whereas extruder, chill and take-up roll RPM were 8, 18 and 18, respectively, from variable adjustments, respectively. The film thickness produced was 1.5 mils except for material blend 13 shown in Table 1, which was 2 mils. The film thickness was adjusted to b 1.5 mils by reducing the extruder RPM from 8 to 6. All of the conditions were maintained. The film clarity was greatly improved in the 25:75 (15% PC) blend.

EXPERIMENT 3

Hot Tack

Cast films produced were tested for self-adhesion through a heated band sealer at 20 psi sealing pressure. At a water pressure of 10'', hot tack was rated at varying sealing temperatures and dwelling time. Table 2 categorizes the rating into "passed" and "failure". Self-adhesion on film was considered "passed" if the seal did not split apart at a length greater than 0.3 cm of the sealed opening at a specified height (in) of water. Interestingly enough, all the blended PB materials at 2 seconds dwelling time and 15 inches of water "passed" at 225° F. to 235° F. since the pure PB8A (undegraded version) failed in a similar test.

EXPERIMENT 4

Tensile Strength

Tensile strength of the cast films was investigated in both machine and transverse direction. Table 3 shows the tensile properties tested under room temperature. Blends of chemically degraded and undegraded PB showed lower yield and break, with higher elongation at break (%) relative to pure uncracked PB8A along machine direction.

EXPERIMENT 5

Film Sealability

In another test, RT tensile film seals, 4 of the 5 materials (blend numbers 1, 8, 9, 12 and 13) peeled apart at less than 1 pound yield load. Only material blend 13 (25:75 containing chemically degraded component with 15% PC) survived a much higher load.

Table 4 is a comparison of the sealability of the unique molecular weight distribution blend versus a conventional blend for polypropylene coatings. Hot tack strength is shown in inches of water based on 1 mil cast film with sealing conditions: 40 psi pressure, 2 second dwell time and two side heated. Sealing temperature ranges were from 160° F. to 220° F. The blend compositions were of approximately the same melt flows, two being standard polybutylene/polypropylene blends and the third a unique molecular weight distribution blend of polybutylene and chemically degraded polybutylene with polypropylene. As can be noted, the unique molecular weight distribution blend has resulted in super clear optics and a hot tack strength of 15 inches consistently from 160° F. to 220° F. In addition, the seal strength of the unique molecular weight distribution blend at 180° F. or greater is more acceptable than that of the first two conventional blends, so that the unique molecular weight distribution blend results in excellent hot tack strength and good seal strength while having excellent clarity.

Certain changes in the above description of preparing the polymer blend and film may be made without departing from the scope of this invention and it is intended that all matter contained in this description is interpreted as illustrative and not in a limiting sense.

TABLE 1

MELT FLOW TEST RESULT @ 190° C. OF UNCRACKED, CRACKED AND BLENDED PB 8A[a]

| | Material Blend # | % PC Peroxide Concentrate[b] | Melt Flow (g/10 min) |
|---|---|---|---|
| (A) Uncracked PB 8A | 1 | 0 | 0.7 |
| (B) Cracked PB 8A | 2 | 3 | 21.6 |
| | 3 | 6 | 62.8 |
| | 4 | 12 | 157.4 |
| | 5 | 15 | 208.8 |
| (C) Blended (Cracked to Uncracked) | | | |
| 1. 10/90 Blend Ratio | 6 | 3 | 1.1 |
| | 7 | 6 | 1.4 |
| | 8 | 12 | 2.9 |
| | 9 | 15 | 4.1 |
| 2. 25/75 Blend Ratio | 10 | 3 | 2.1 |
| | 11 | 6 | 5.3 |
| | 12 | 12 | 13.9 |
| | 13 | 15 | 20.2 |

[a]Melt flow is based on ASTM D1238, Condition "E" at 190° C.
[b]Relative to cracked component.

TABLE 2

SELF-ADHESION (HOT TACK) RATING OF UNCRACKED PB AND BLENDS OF CRACKED AND UNCRACKED PB 8A

| Sealing Temp. (°F.) | Seal Dwelling Time (Secs) | 15" of H₂O | | | 10" of H₂O | | |
|---|---|---|---|---|---|---|---|
| | | Uncracked PB 8A | Cracked to Uncracked Blend Ratio | | Uncracked PB 8A | Cracked to Uncracked Blend Ratio | |
| | | | 10:90 | 25:75 | | 10:90 | 25:75 |
| 240 | 1 | Passed | Excessive | Softening | — | — | — |
| 235 | 1 | Failed | Passed | Passed | Passed | Passed | Passed |
| | 2 | Failed | Passed | Passed | Passed | Passed | Passed |
| 230 | 1 | Failed | Passed | Passed | Failed | Passed | Passed |
| | 2 | Failed | Passed | Passed | Failed | Passed | Passed |
| 225 | 1 | Failed | Failed | Failed | Failed | Passed* | Failed |
| | 2 | Failed | Passed | Passed | Failed | Passed* | Failed |

*Seal opened up slightly
Sealing Pressure = 20 psi.
Calibrating H₂O Pressure = 0.10".
Passed = the seal did not split apart at greater than 0.3 cm of the seal opening at a specified height (in) of water.

TABLE 3

R.T. TENSILE PROPERTIES OF PB 8A CAST FILM

| | % Peroxide Concentrate | Machine Direction | | | Transverse Direction | | |
|---|---|---|---|---|---|---|---|
| | | Yield (psi) | Break (psi) | % E(BRK) | Yield (psi) | Break (psi) | % E(BRK) |
| A. Uncracked PB 8A | 0 | 2440 | 8500 | 218 | 1880 | 3770 | 355 |
| B. Blended (Cracked to Uncracked) | | | | | | | |
| 1. 10:90 Blend Ratio | 12 | 1910 | 4910 | 319 | 1860 | 4390 | 319 |
| 2. 10:90 Blend Ratio | 15 | 2070 | 5220 | 320 | 1890 | 4100 | 299 |
| 3. 25:75 Blend Ratio | 12 | 2100 | 4610 | 319 | 1760 | 3530 | 292 |
| 4. 25:75 Blend Ratio | 15 | 2270 | 4280 | 305 | 1870 | 3800 | 323 |

TABLE 4

COMPARISON OF SEALABILITY ON THE UNIQUE MWD BLEND VS. CONVENTIONAL BLEND FOR PP COATINGS

| BLEND COMPOSITION, OPTICAL | MELT FLOW, dg/min 190° C.** | HOT TACK STRENGTH, IN. OF $H_2O$* (SEAL STRENGTH, G/IN.) SEALING TEMPERATURE, °F. | | | | |
|---|---|---|---|---|---|---|
| | | 160 | 170 | 180 | 200 | 220 |
| PB 8B/PP 5A (75/25), HAZY | 2.7 | — (—) | 15 (66) | 15 (509) | 15 (940) | 15 (1817) |
| PB 8B/PP 5B, (75/25), HAZY | 2.0 | 15 (54) | — (—) | 15 (563) | 15 (1212) | 15 (1553) |
| UNIQUE MWD BLEND, (PB 8A + CHEM. DEG. PB 8A)/ PP 5B (75/25), SUPER CLEAR | 2.5 | 15 (—) | 15 (129) | 15 (893) | 15 (1143) | 15 (1116) |

*Based on 1 mil cast film with sealing conditions: 40 psi pressure, 2 second dwell time and two side heated.
**Melt Flow (MF) is based on ASTM D1238 condition "E" at 190° C.

What is claimed is:

1. A unique molecular weight distribution polymer blend for forming molded parts, such as thin films, which has improved hot tack, low heat sealing temperature and high clarity, comprising:
a first butene-1 homopolymer or copolymer with a melt flow of from about 0.5 to about 1.0 and a second butene-1 homopolymer or copolymer with a melt flow from about 150 to about 250, wherein said second butene-1 homopolymer or copolymer has been chemically degraded by the use of peroxide, and wherein said first butene-1 homopolymer or copolymer and said second butene-1 homopolymer or copolymer are combined in a weight proportion of from about 70:30 to about 95:5.

2. The polymer blend of claim 1, wherein:
said first butene-1 homopolymer or copolymer contains ethylene or propylene as a comonomer, and said second butene-1 homopolymer or copolymer contains ethylene or propylene as a comonomer, said melt flow of said first butene-1 homopolymer or copolymer is preferably about 0.7, said melt flow of said second butene-1 homopolymer or copolymer is preferably about 200, and said first butene-1 homopolymer or copolymer and said second butene-1 homopolymer or copolymer are combined in a weight proportion of from about 75:25 to about 90:10.

3. The polymer blend of claim 1, wherein:
said first butene-1 homopolymer or copolymer and said second butene-1 homopolymer or copolymer are preferably combined in a weight proportion of about 85:15.

4. The polymer blend of claim 1, wherein said melt flow of said blend is from about 2 to about 25.

5. The polymer blend of claim 1, wherein said melt flow of said blend is preferably about 8 to 15.

6. A unique molecular weight distribution polymer blend for forming molded parts, such as thin films, which have improved hot tack, low heat sealing temperature and high clarity, comprising:
a first butene-1 homopolymer or copolymer with a melt flow of about 0.7 and a second butene-1 homopolymer or copolymer with a melt flow of about 200, wherein said second butene-1 homopolymer or copolymer has been chemically degraded by the use of peroxide and wherein said first butene-1 homopolymer or copolymer and said second butene-1 homopolymer or copolymer are combined in a weight proportion of from about 75:25 to about 90:10.

7. The polymer blend of claim 6, wherein said first butene-1 homopolymer or copolymer and said second butene-1 homopolymer or copolymer are preferably combined in a weight proportion of about 85:15.

8. The polymer blend of claim 6, wherein the melt flow of said blend is from about 15 to about 25.

9. The polymer blend of claim 6, wherein said melt flow of said blend is preferably about 8 to 15.

10. A unique molecular weight distribution polymer blend for forming molded parts such as thin films which have improved hot tack, low heat sealing temperature and high clarity, comprising:
a first butene-1 homopolymer or copolymer with a melt flow of preferably about 0.7 and a second butene-1 homopolymer or copolymer with a melt flow of preferably about 200, wherein said second butene-1 homopolymer or copolymer has been chemically degraded by the use of peroxide, and wherein said first butene-1 homopolymer or copolymer and said second butene-1 homopolymer or copolymer are combined in a weight proportion of preferably 85:15, wherein said melt flow of said polymer blend is preferably about 8 to 15.

11. A polymer film having improved hot tack, low heat sealing temperature and high clarity, comprising:
a polypropylene or polypropylene-based copolymer or blend as a substrate or core layer; and
a first butene-1 homopolymer or copolymer with a melt flow of from about 0.5 to about 1.0, a second butene-1 homopolymer or copolymer with a melt flow from about 150 to about 250, wherein said second butene-1 homopolymer or copolymer has been chemically degraded by the use of peroxide, and a third propylene homopolymer or copolymer with a melt flow of 0.5 to 5.0, and wherein said first butene-1 homopolymer or copolymer, said second butene-1 homopolymer or copolymer, and said third propylene homopolymer or copolymer are combined in a weight proportion of from about 75:10:15 to about 45:25:30.

12. The polymer blend of claim 11, wherein:
said first butene-1 homopolymer or copolymer contains ethylene or propylene as a comonomer, and said second butene-1 homopolymer or copolymer contains ethylene or propylene as a comonomer, said melt flow of said first butene-1 homopolymer or copolymer is preferably about 0.7, said melt flow of said second butene-1 homopolymer or copolymer is preferably about 200, and said first butene-1 homopolymer or copolymer, said second butene-1 homopolymer or copolymer and said third propylene homopolymer or copolymer are combined in a weight proportion of from about 65:15:20 to about 55:20:25.

13. The polymer blend of claim 11, wherein: said first butene-1 homopolymer or copolymer, said second butene-1 homopolymer or copolymer and said third propylene homopolymer or copolymer are preferably combined in a weight proportion of about 60:17.5:22.5.

14. The polymer blend of claim 11, wherein said melt flow of said blend is from about 2 to about 5.

15. The polymer blend of claim 11, wherein said melt flow of said blend is preferably about 2.5.

16. A polymer film having improved hot tack, low heat sealing temperature and high clarity, comprising:
 a polypropylene or polypropylene-based copolymer or blend as a substrate or core layer; and
 a first butene-1 homopolymer or copolymer with a melt flow of about 0.7, a second butene-1 homopolymer or copolymer with a melt flow of about 200, wherein said second butene-1 homopolymer or copolymer has been chemically degraded by the use of peroxide, and a third propylene homopolymer or copolymer with a melt flow of 2, and wherein said first butene-1 homopolymer or copolymer, said second butene-1 homopolymer or copolymer and said third propylene homopolymer or copolymer are combined in a weight proportion of from about 65:15:20 to about 55:20:25.

17. The polymer blend of claim 16, wherein said first butene-1 homopolymer or copolymer, said second butene-1 homopolymer or copolymer and said third propylene homopolymer or copolymer are preferably combined in a weight proportion of about 69:17.5:22.5.

18. The polymer blend of claim 16, wherein the melt flow of said blend is from about 2 to about 5.

19. The polymer blend of claim 16, wherein said melt flow of said blend is preferably about 2.5.

20. A polymer film having improved hot tack, low heat sealing temperature and high clarity, comprising:
 a polypropylene or polypropylene-based copolymer or blend as a substrate or core layer; and
 a first butene-1 homopolymer or copolymer with a melt flow of preferably about 0.7, a second butene-1 homopolymer or copolymer with a melt flow of preferably about 200, wherein said second butene-1 homopolymer or copolymer has been chemically degraded by the use of peroxide, and a third propylene homopolymer or copolymer with a melt flow of 2.5 and wherein said first butene-1 homopolymer or copolymer, said second butene-1 homopolymer or copolymer and said third propylene homopolymer or copolymer are combined in a weight proportion of preferably 60:17.5:22.5.

* * * * *